United States Patent [19]
Haushalter et al.

[11] Patent Number: 5,722,145
[45] Date of Patent: Mar. 3, 1998

[54] QUICK CHANGE DEVICE FOR A ROBINSON FIN MACHINE

[75] Inventors: David L. Haushalter, Kenton; Mark F. Haushalter, Bellefontaine; Philip D. Lowe, Kenton, all of Ohio

[73] Assignee: Robinson Fin Machines, Inc., Kenton, Ohio

[21] Appl. No.: 680,832

[22] Filed: Jul. 16, 1996

[51] Int. Cl.$^6$ .................................................. B23Q 17/00
[52] U.S. Cl. ..................... 29/404; 29/407.01; 29/407.05
[58] Field of Search ............................ 72/31.01, 31.02, 72/31.1, 31.11, 385, 447; 29/33.5, 404, 560, 407.01, 407.04, 407.05, 407.09, 407.1

[56] References Cited

U.S. PATENT DOCUMENTS

| | | | |
|---|---|---|---|
| 3,470,601 | 10/1969 | Jones | 29/404 |
| 3,760,624 | 9/1973 | Robinson | 72/385 |
| 4,550,588 | 11/1985 | Abe et al. | 72/472 X |
| 4,635,462 | 1/1987 | Bald | 72/385 |
| 4,676,090 | 6/1987 | Nishimura et al. | 72/472 X |
| 4,934,169 | 6/1990 | Sjogren | 72/447 X |
| 4,991,281 | 2/1991 | Ikeda et al. | 29/404 X |
| 5,105,649 | 4/1992 | Hite et al. | 29/407.05 X |

*Primary Examiner*—Daniel Moon
*Attorney, Agent, or Firm*—Barbara Joan Haushalter

[57] ABSTRACT

A quick change device is adaptable for use on a reciprocating press fin machine which continuously forms a metal sheet into sinuous or corrugated configuration by using tools associated with upper and lower opposed, metal-engaging tools, each movable toward and away from the other in a vertical forming stroke, and a first one of these tools also being movable in a variable stroke transverse to its vertical forming stroke. Wedge-shaped abutment elements and associated block elements having a wedge-shaped cavity therein adapted to receive the abutment elements, establish the length of transverse motion of the first tool. A structure is used to simulate the reciprocating press fin machine. A reader assembly digitally analyzes movement of the wedge-shaped abutment elements to set the transverse stroke length, based on the simulation provided by the structure, to allow precise alignment of the tools in the reciprocating press fin machine.

14 Claims, 3 Drawing Sheets

QUICK CHANGE DEVICE FOR A ROBINSON FIN MACHINE

BACKGROUND OF THE INVENTION

The present invention relates to finned heat transfer devices and products and, more particularly, to a system and method for more quickly accomplishing machine set up and tool changing on a self feeding continuous forming device, known in the industry as a Robinson fin machine.

Various types of apparatus are known in the art for forming, crimping, folding, perforating, and otherwise processing, sheet or strip material, such as sheet metal. One such apparatus is a rolling fin machine utilizes a gear mesh operation to form fin as the fin material passes between the two gears. Another type is the reciprocating press fin machine, such as the Robinson fin machine, as is described and claimed in U.S. Pat. No. 3,760,624, the disclosure of which is totally incorporated herein by reference. The Robinson fin machine stamps the fin material into sinuous or corrugated configuration for the aerospace, automotive, electronic and solar energy industries.

The Robinson fin machine has the capability to form a variety of material types, including aluminum alloys, stainless steel, copper, brass, nickel and carbon steel into many different fin types or patterns, such as ruffled, herringbone, plain flat crest, plain radius crest, lanced, and louvered, with multiple fin heights and tolerance capabilities possible.

All of the above mentioned fin products can be produced using a single Robinson fin machine. However, each different fin product is achieved with a different machine set up. Currently, machine set up and disassembly or changeover of the machine to accommodate production of each different type of fin product is accomplished on-line, and can be very time consuming. On-line setup includes setting stripper heights, setting strokes, and setting tool height relative to the strippers. All of this setup can take several hours to complete. In any manufacturing operation, any time a non-productive action is occurring on-line, the machine is not producing. Obviously, non-production is extremely undesirable and expensive.

In an effort to reduce non-production of the machine resulting from such required changes, U.S. Pat. No. 5,003,690 describes a quick change device that has been developed for the rolling fin machine. With the quick change device described therein, a variety of finned tubes and types of fin can be produced using the same rolling fin machine with minimum change time and less machine parts and tooling. However, the quick change device disclosed in the '690 patent is used on the rolling fin machine, which is a gear mesh operation, and is not readily adaptable for use on a self-feeding continuous forming device, such as the Robinson fin machine, which is a reciprocating press machine.

It is seen then that there exists a need for a quick change device for the Robinson fin machine which will reduce machine set up time and tool change time.

SUMMARY OF THE INVENTION

This need is met by the quick change device according to the present invention, which simulates a Robinson fin machine to reduce machine set up and tool change time for the fin machine. The invention digitally analyzes movement of an angle block member, or wedge, to set a required stroke. The wedge moves in and out perpendicular to the stroke. A most unique feature of this invention is the use of a separate structure which simulates the closed position of lower and upper heads of a Robinson fin machine.

In accordance with one aspect of the present invention, a quick change device moves machine set up off-line to reduce down time of the machine. A structure is used to simulate lower and upper head positions of a reciprocating press fin machine. Movement of the wedge is digitally analyzed to set the stroke, based on the position of the heads, allowing proper placement and alignment of the tools in the machine.

Accordingly, it is an object of the present invention to provide a quick change device suitable for simulating a reciprocating press fin machine. It is also an object of the present invention to move machine set up and change-overs off-line. It is an advantage of the present invention that the setting of stripper heights and strokes is now digitally accomplished; and the step of setting tool height on the fin machine is eliminated, since the tool can now simply be set in the machine after the digital steps, eliminating the need to set the tool height. It is a further advantage of the present invention that the machine set up time is reduced from several hours to only a fraction of an hour, thereby substantially reducing down time of the fin machine.

Other objects and advantages of the invention will be apparent from the following description, the accompanying drawings and the appended claims.

DETAILED OF THE PREFERRED EMBODIMENTS

The present invention provides for a quick change device for use on a reciprocating press type fin machine. The quick change device is particularly suitable for use on the self feeding continuous forming device, known in the industry as the Robinson fin machine, such as is described in U.S. Pat. No. 3,760,624, incorporated herein by reference.

Figures 1A, 1B:
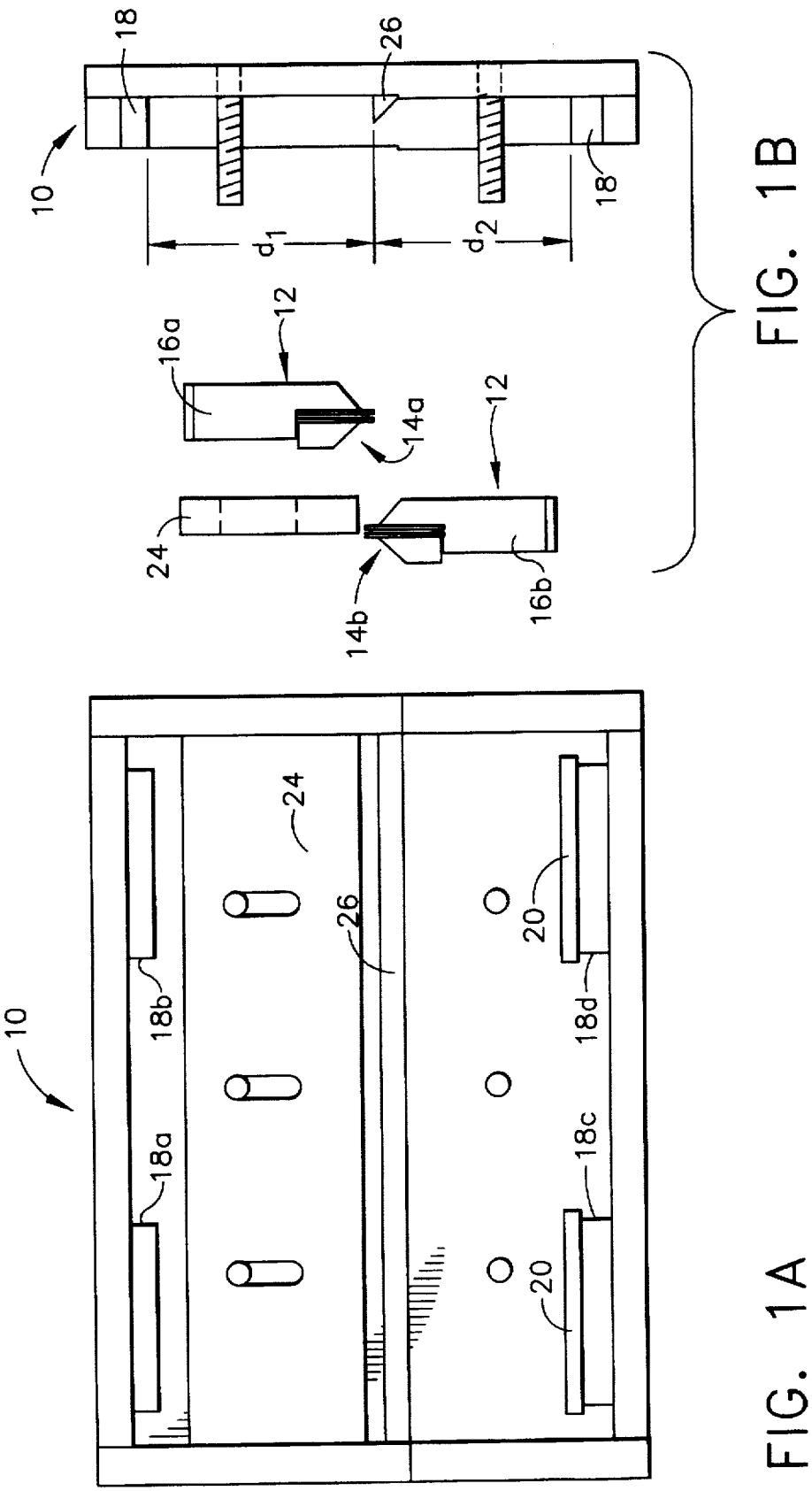
FIGS. 1A and 1B are front and side views, respectively, of a structure used to simulate the upper and lower heads of a reciprocating press fin machine, for illustrating off-line placement of tools for alignment and positioning.

Referring now to the drawings, FIGS. 1A and 1B, illustrate front and side views, respectively, of a structure 10, remote from the fin machine. The structure 10 is used to simulate upper and lower heads of a Robinson fin machine. FIGS. 1A and 1B further illustrate off-line placement of tool assembly 12 for alignment and positioning, in accordance with the present invention. Tool assembly 12 is comprised of upper and lower tools 14a and 14b, respectively, and associated tool holders 16a and 16b, respectively. Simulated upper stripper 24 position, which has variable positions, is set relative to simulated lower stripper 26, which is stationary. The lower tool 14b height is then set relative to the simulated upper stripper 24. The upper tool 14a height is then set relative to the simulated lower stripper 26 or to the lower tool 14b height. The simulated upper and lower strippers 24 and 26 represent, or simulate, actual upper and lower strippers on the Robinson fin machine. The actual upper and lower strippers are used to strip material off the upper and lower tools 14a and 14b, respectively, when the machine is operating.

Continuing with FIGS. 1A and 1B, the structure 10 comprises a plurality of spacer blocks 18, specifically labeled 18a, 8b, 18c, 18d, sized to set the exact height required for the upper tool and the exact height required for the lower tool, allowing exact height transference of the tools to the fin machine. Varying numbers of varying thickness shims 20 may be stacked on the spacer blocks 18 to set the correct tool height, relative to the simulated strippers. The number of shims can vary from zero to any maximum number, according to the height required. Hence, the distance $d_1$, from the bottom of spacer blocks 18a and 18b to the top of simulated lower stripper 26, will exactly match the corresponding distance on the Robinson fin machine. Likewise, the distance $d_2$, from the top of simulated lower stripper 26 to the top of the spacer blocks 18c and 18d will also exactly match the corresponding distance on the Robinson fin machine. Consequently, the tool height can be set off-line, by varying the number and thickness of the shims. Once the number and thickness of the shims has been determined off-line, the required shims and tools can then be moved to the fin machine, with the exact tool height already determined and set. This eliminates the need to determine tool height on the fin machine itself.

The quick change technique according to the present invention uses tool assembly 12 associated with upper (not shown) and lower opposed, metal-engaging tools, or dies, 14a and 4b, each movable toward and away from the other in a vertical forming stroke. The lower tool 14b is also movable in a variable stroke transverse to its vertical forming stroke. Wedge assemblies 38 establish the length of transverse motion of the lower tool 14b. Wedge assemblies 38 are comprised of wedge-shaped abutment elements 32, one associated with the setting of the front stroke, and the other associated with the setting of the back stroke, receivable into block elements 34. The block elements 34 include a wedge-shaped cavity therein adapted to receive the associated abutment element 32.

The quick change technique of the present invention comprises the structure 10 for simulating the upper and lower heads, to which the upper and lower tools are mounted. Front and back stroke reader assemblies 40f and 40b, respectively, digitally analyze movement of the wedge-shaped abutment elements 32 to set the transverse stroke length, based on the simulation provided by the structure 10. The reader assemblies 40 may be any suitable means, such as one or more commercially available digital displays and associated reader heads 42. Back stroke reader assembly 40b sets the back stroke; front stroke reader assembly 40f sets the front stroke; and first and second upper stripper reader assemblies digitally set the upper stripper height for the actual upper stripper, based on a determination of fin height and material thickness. Associated readouts can be used to read the actual distance between the two rear strippers.

Figure 2:
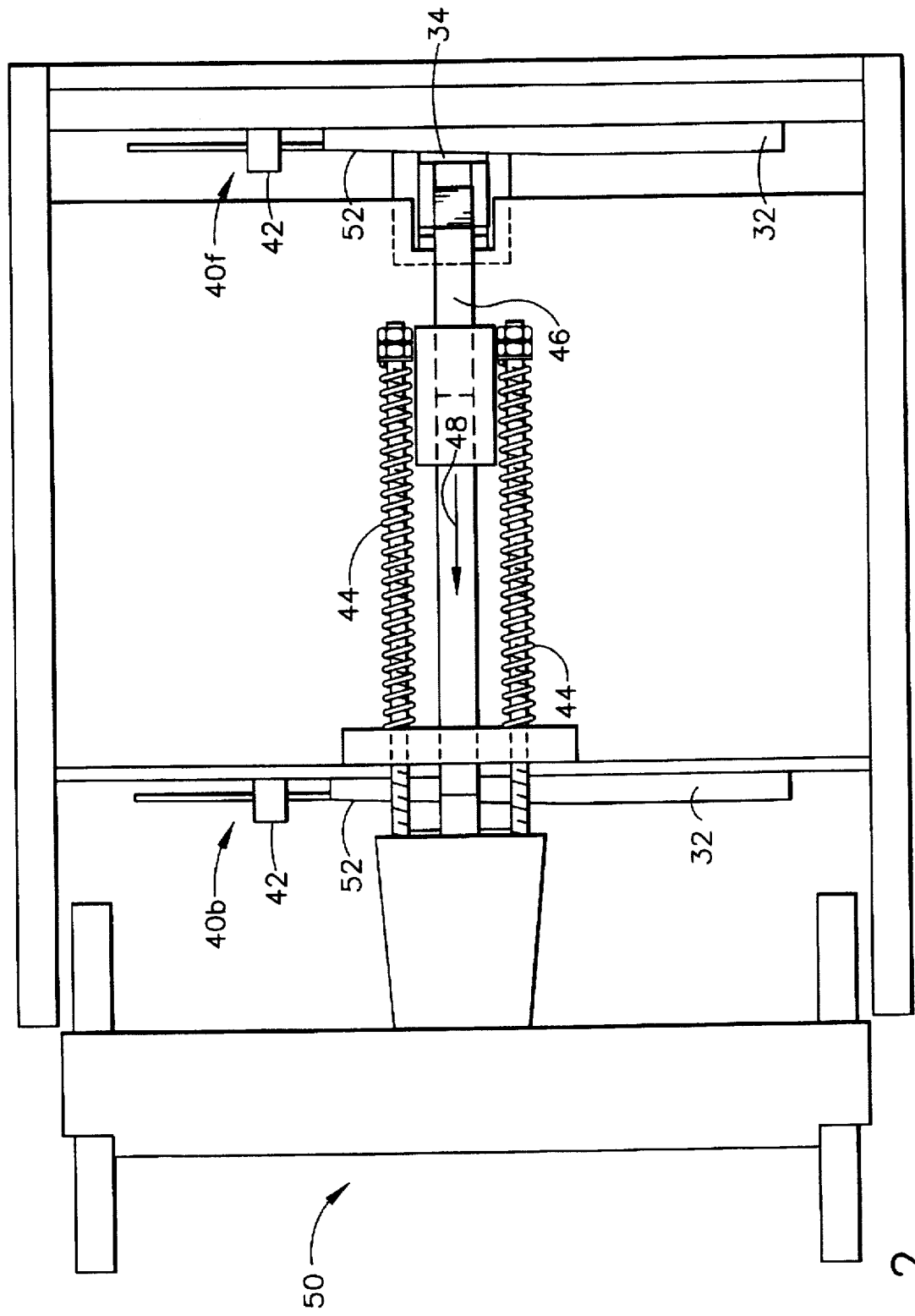
FIG. 2 is a cutaway top view of a reciprocating press fin machine illustrating the means for digitally analyzing movement of a wedge to set fin machine stroke.

FIG. 2 illustrates a partial top view of a Robinson fin machine 50 illustrating the means for digitally analyzing the movement of the wedge shaped abutment elements 32 to set the front and back strokes of the fin machine. Digitally analyzing the movement of the wedge-shaped abutment elements 32 allows alignment of tool assembly 12 in the fin machine, as illustrated in FIG. 2. Alignment of the tool assembly 12 is accomplished by setting the front and back strokes of the fin machine, i.e., the transverse motion of the lower tool 4b. Springs 44 associated with the tool assembly 12 provide a pulling force on the tool assembly, attached to the lower head, to pull the tool back during the back stroke. Rod 46 pushes the lower head forward, in the direction of arrow 48. Sloped surfaces 52 on the wedge-shaped abutment elements 32 allow for changes in the strokes, i.e., the distance that the lower tool moves backward and forward. Therefore, the strokes are varied by changing the wedge assemblies.

Figure 3:
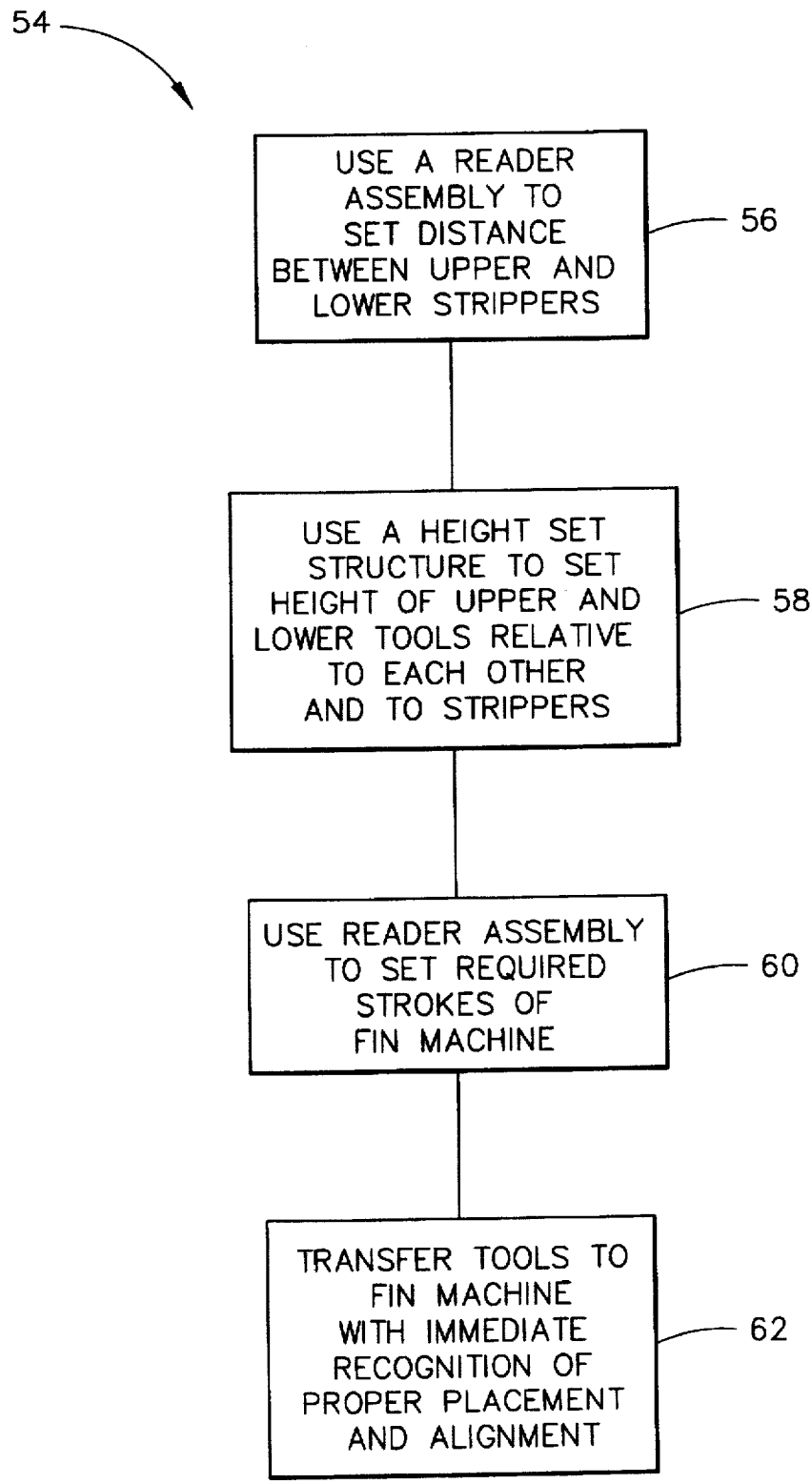
FIG. 3 is a flow chart illustrating the steps for achieving proper placement and alignment of tools in a reciprocating press fin machine, in accordance with the present invention.

Referring now to FIG. 3, flow chart 54 illustrates the steps for achieving proper placement and alignment of tools in a reciprocating press fin machine. In step 56, a reader assembly 40 is used to set a distance between the upper and lower strippers. Subsequently, in step 58, the quick change structure 10 is used to set the height of the upper and lower tools 14a and 14b, relative to each other and relative to the strippers. The reader assembly 40 is then used, as indicated in step 60, to set the required strokes of the fin machine. All of steps 56, 58 and 60, then, are accomplished off-line of the fin machine. In step 62, the tools 14a and 14b are transferred to the fin machine, with immediate knowledge of the proper placement and alignment for the tools.

Having described the invention in detail and by reference to the preferred embodiment thereof, it will be apparent that other modifications and variations are possible without departing from the scope of the invention defined in the appended claims.

We claim:

1. A quick change device for a reciprocating press fin machine having upper and lower heads, for continuously forming a metal sheet into sinuous or corrugated configuration by using tools associated with upper and lower opposed, metal-engaging tools, each movable toward and away from the other in a vertical forming stroke, the lower tool also being movable in a variable stroke transverse to its vertical forming stroke, upper and lower strippers for stripping material off the upper and lower tools when the fin machine is operating, a wedge-shaped abutment element and a block element having a wedge-shaped cavity therein adapted to receive the abutment element for establishing the length of transverse motion of the lower tool, the quick change device comprising:

a structure for simulating the reciprocating press fin machine; and a reader assembly means for analyzing movement of the wedge-shaped abutment elements to set the transverse stroke length, based on the simulation provided by the structure, allowing alignment of the tools in the machine.

2. A quick change device as claimed in claim 1 wherein the reader assembly means digitally analyzes movement of the wedge-shaped abutment elements.

3. A quick change device as claimed in claim 2 wherein the reader assembly means comprises a digital display and at least one reader head.

4. A quick change device as claimed in claim 2 wherein movement of the wedge is digitally analyzed based on position of the upper and lower heads.

5. A quick change device as claimed in claim 1 wherein the structure simulates the upper and lower heads of the reciprocating press fin machine.

6. A quick change device as claimed in claim 1 wherein the structure receives a tool assembly requiring setting of tool height.

7. A quick change device as claimed in claim 6 wherein the tool assembly comprises:

upper and lower tools; and an associated tool holder.

8. A quick change device as claimed in claim 7 wherein lower tool height is set relative to the upper stripper.

9. A quick change device as claimed in claim 8 wherein upper tool height is set relative to the lower stripper or the lower tool height.

10. A quick change device as claimed in claim 7 wherein the tool assembly further comprises:

a plurality of spacer blocks sized to set an exact height required for the upper tool and an exact height required for the lower tool;

a plurality of varying thickness shims stackable on the plurality of spacer blocks to set a desired tool height, relative to the upper and lower strippers.

11. A quick change device as claimed in claim 1 wherein the reader assembly means comprises:

a back stroke reader assembly for setting a back stroke;

a front stroke reader assembly for setting a front stroke; and first and second upper stripper reader assemblies for digitally setting the upper stripper height, based on a determination of fin height and material thickness.

12. A method for achieving proper placement and alignment of tools in a reciprocating press fin machine for continuously forming a metal sheet into sinuous or corrugated configuration associated with upper and lower opposed, metal-engaging tool, and further having upper and lower strippers for stripping material off the upper and lower tools when the fin machine is operating, the method comprising the steps of:

using a reader assembly to set a distance between the upper and lower strippers;

setting the upper stripper position relative to the lower stripper;

setting the lower tool height relative to the upper stripper position;

setting the upper tool height relative to the lower stripper position or to the lower tool height;

setting required strokes of the fin machine using the reader assembly;

transferring the set upper and lower tools to the fin machine.

13. A method as claimed in claim 12 wherein the upper stripper has variable positions.

14. A method as claimed in claim 12 wherein the lower stripper is stationary.

* * * * *